UNITED STATES PATENT OFFICE.

ROBERT KOENITZER, OF ST. LOUIS, MISSOURI, ASSIGNOR TO HIMSELF AND LOUIS C. HERMANN, OF SAME PLACE.

TANNING PROCESS.

SPECIFICATION forming part of Letters Patent No. 243,923, dated July 5, 1881.

Application filed March 16, 1881. (No specimens.)

*To all whom it may concern:*

Be it known that I, ROBERT KOENITZER, of St. Louis, in the State of Missouri, have invented a new and useful Improvement in Processes for Tanning Leather, of which the following is a full, clear, and exact description.

My invention consists in certain novel combinations of ingredients to form different compounds, and in a novel mode of treating the skin in said compounds, whereby great strength, toughness, durability, and elasticity are imparted to the leather, and less time, space, and labor are required than in the ordinary tanning processes.

In carrying out the invention I employ the following ingredients in the following manner: For treating one hundred pounds of hides, after they have been prepared in the usual manner for bark-tanning, I proceed as follows: I take of copperas, ten pounds; bichromate of potassium, one-half pound; alum, two and one- pounds; hot water, two gallons. These ingredients are thoroughly mixed, and when the mineral substances are thoroughly dissolved I add twenty-eight gallons of water to the solution, and then work the hides therein and allow them to soak for about eight hours. The hides are then removed, and the following solution is added to the first, viz: salt, three pounds; salt of tin, four ounces; hot water, one-half gallon. The hides are again placed in the solution and allowed to remain about twenty hours, being handled and worked at intervals. They are again removed, and the following solution is added to the compound: copperas, eight pounds; bichromate of potassium, one-half pound; alum, two and one-half pounds; saltpeter, one ounce; hot water, one and one-half gallon. The hides are again placed in the compound and allowed to remain about forty hours, being handled and worked at intervals, and are then well soaked in clear water and hung up to dry. After the hides are dry they are placed in a solution prepared as follows: sugar of lead, two ounces; hot vinegar, one quart; water, five gallons; glycerine, one-half gallon. After being well worked and handled in this solution, in a lukewarm state, the hides are scoured and finished in the same manner as after the bark-tanning process.

Having thus described my invention, I claim as new and desire to secure by Letters Patent—

The process of tanning hides by first treating them with a bath or solution of copperas, bichromate of potassium, and alum, then adding a solution of salt and salt of tin to the bath, then adding a solution of copperas, bichromate of potassium, alum, and saltpeter to the same bath, then removing and drying the hides, and finally treating them with a solution composed of sugar of lead, vinegar, water, and glycerine, substantially as herein described.

ROBERT KOENITZER.

Witnesses:
E. EIKHOFF,
RUDOLPH PETERS.